(12) United States Patent
Murakami

(10) Patent No.: US 6,763,283 B1
(45) Date of Patent: Jul. 13, 2004

(54) VISUAL CONTROL ROBOT SYSTEM

(75) Inventor: Naoyuki Murakami, Tokyo (JP)

(73) Assignee: Record Audio Inc., Tokyo (JP)

( * ) Notice: Subject to any disclaimer, the term of this patent is extended or adjusted under 35 U.S.C. 154(b) by 877 days.

(21) Appl. No.: 08/924,856

(22) Filed: Sep. 5, 1997

(30) Foreign Application Priority Data

Sep. 10, 1996 (JP) .............................................. 8-238937

(51) Int. Cl.$^7$ .............................................. G06F 15/50
(52) U.S. Cl. .......................... 700/259; 701/28; 382/153; 348/113
(58) Field of Search ............................. 395/80, 88, 99, 395/84, 94, 93; 364/513, 191, 140; 362/233; 128/898; 382/153; 482/904; 700/245, 258, 259; 701/23, 28, 207; 348/113

(56) References Cited

U.S. PATENT DOCUMENTS

| 4,821,206 A | * | 4/1989 | Arora ........................... 364/513 |
| 4,825,394 A | * | 4/1989 | Beamish et al. ........ 364/571.01 |
| 4,887,223 A | * | 12/1989 | Christian ..................... 364/518 |
| 5,109,425 A | * | 4/1992 | Lawton .......................... 382/1 |
| 5,495,410 A | * | 2/1996 | Graf ............................ 364/191 |
| 5,579,444 A | * | 11/1996 | Dalziel et al. ................ 395/94 |
| 5,737,217 A | * | 4/1998 | Nishikawa et al. .... 364/167.01 |
| 5,748,854 A | * | 5/1998 | Watanabe ..................... 395/93 |
| 5,751,610 A | * | 5/1998 | Gan et al. .............. 364/571.03 |
| 5,769,531 A | * | 6/1998 | Hunt et al. ................. 362/233 |
| 5,793,900 A | * | 8/1998 | Nourbakhah et al. ........ 382/263 |

* cited by examiner

Primary Examiner—Emanuel Todd Voeltz
(74) Attorney, Agent, or Firm—Reed Smith LLP

(57) ABSTRACT

A visually controlled robot system has a robot driven in three-dimensions to a target position by instructions from a controller. The position of the robot and its target are determined by video cameras placed to take images of the entire moving area of the robot from at least two directions and a control circuit for interpreting those images.

4 Claims, 2 Drawing Sheets

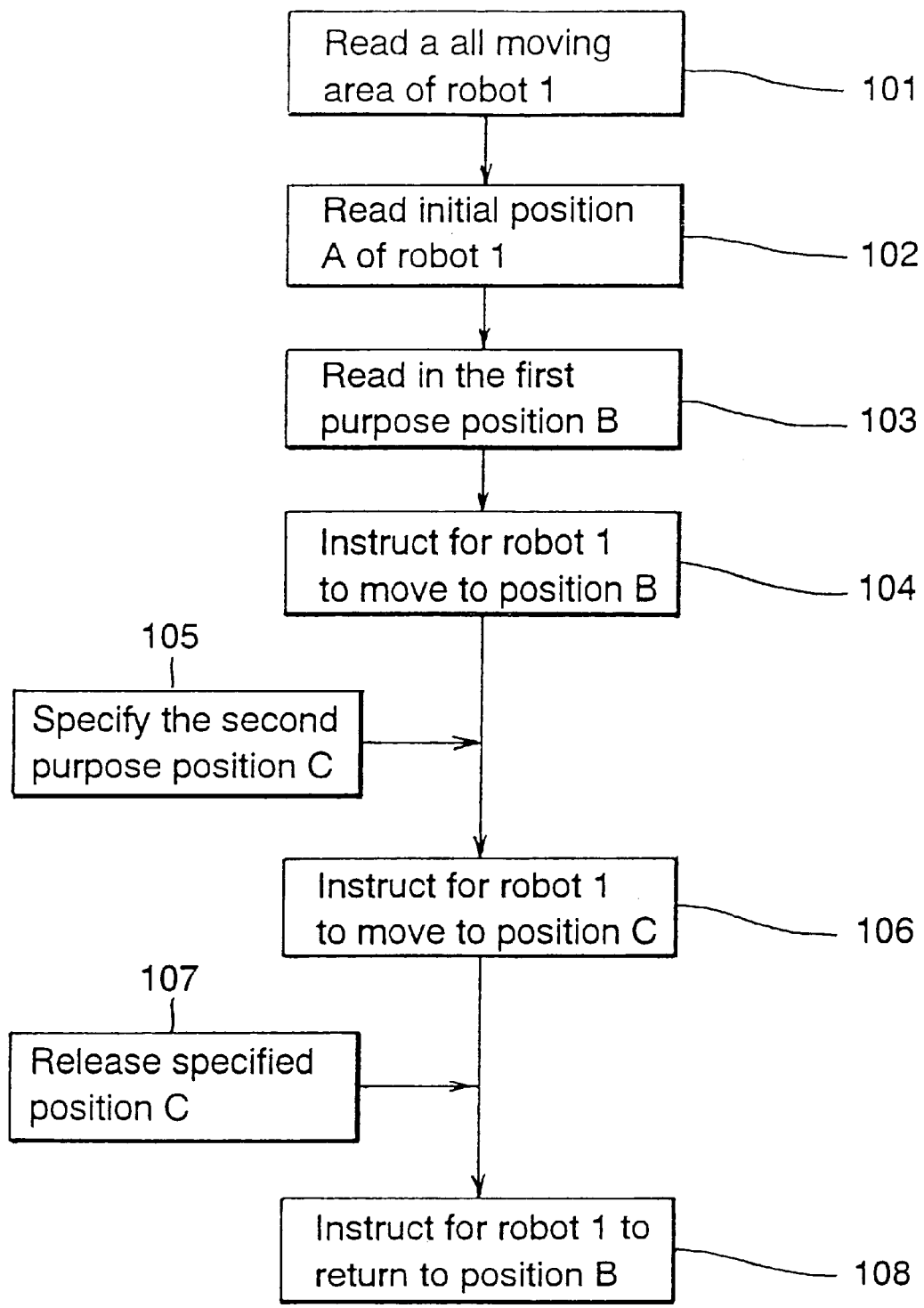

VISUAL CONTROL ROBOT SYSTEM

BACKGROUND OF THE INVENTION

The present invention relates to a robot system in which a moving position is controlled by visual recognition.

Nowadays, a number of robot systems have been employed in industrial fields. In most of the general purpose robot systems, pre-taught operational positions of robot are assigned and stored in a control circuit. As the program goes on, when an operational position is invoked, the robot is displaced to the pre-taught, assigned position.

In some other systems, the robot is provided with a visual sensor which recognizes a target and allows for guidance of the robot in the direction of the target. However, even if a robot is provided with several sensors, the limited size of the robot does not allow the sensors to be set far enough away from each other for the robot to recognize the correct three-dimensional position of the target. Such robot systems, which have not yet been universalized due to their restrictions, still remain costly.

SUMMARY OF THE INVENTION

The primary purpose of the present invention is to furnish a visually controlled robot system that allows for operational control of the robot by means of commercially-available, general-purpose robots and commercially-available, general-purpose visual recognition devices.

To achieve this purpose, the visually controlled robot system of the present invention comprises a robot means for three-dimensional motion, means for taking images of the entire moving area of the robot, a visible target existing within the moving area of the robot, a control circuit having a function which recognizes beforehand the moving area of the robot and another function which stores in a memory the position of the visible target as shown by the images from the image taking means, as well as an ordering signal to move the robot to the position of the visible target, and a drive control means for driving the robot according to said ordering signal.

A visually controlled robot system of another aspect according to the present invention further comprises a display means and an input means. The input means is connected to the control circuit for inputting a coordinate from the display means, and the control circuit has the additional function of giving the drive control means an ordering signal to move the robot to a position corresponding to the coordinate as instructed.

BRIEF DESCRIPTION OF THE DRAWINGS

FIG. 2 represents a flow chart of the operation by the control circuit of the visual control robot system.

DETAILED EXPLANATION OF THE INVENTION

Figure 1:
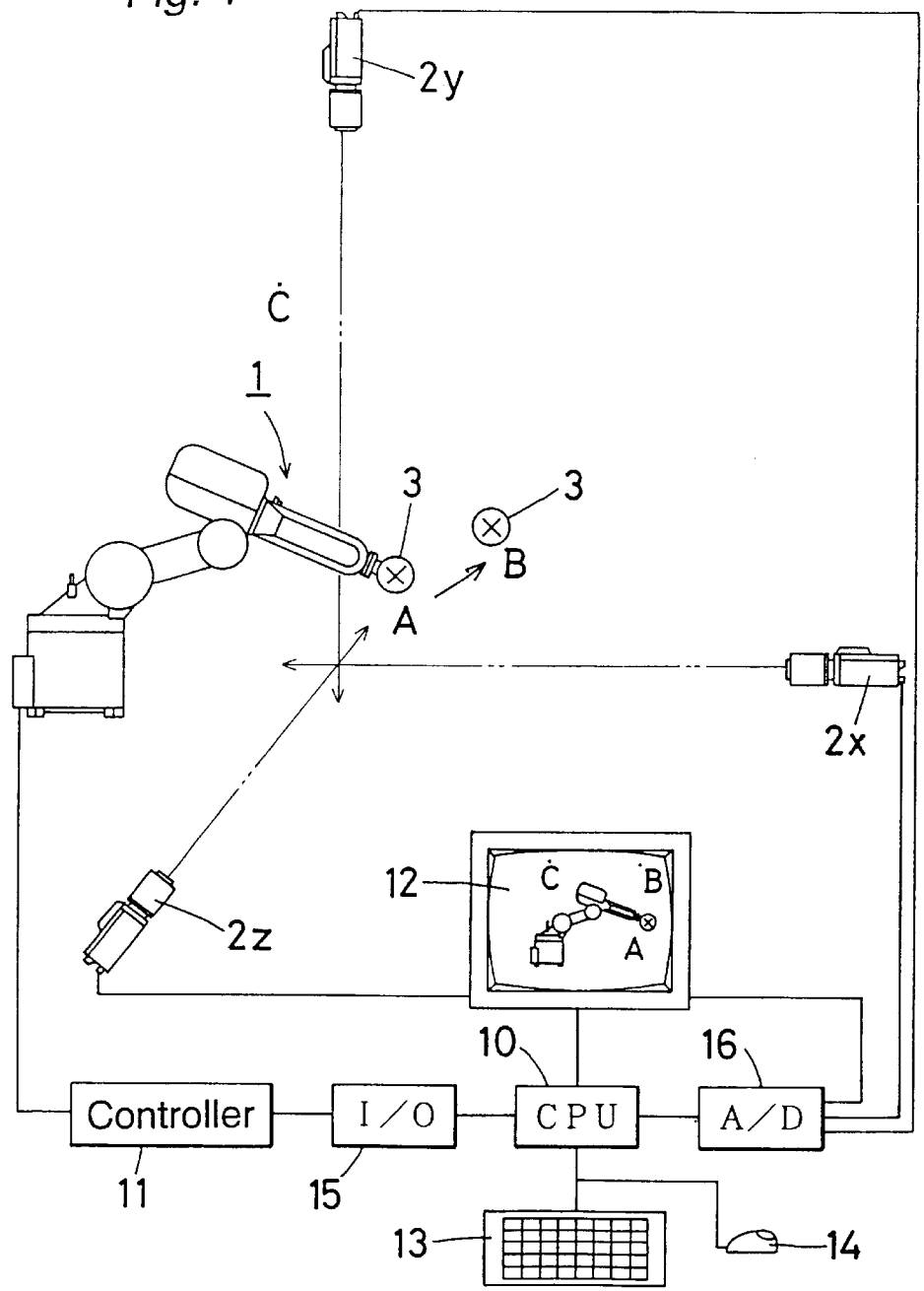
FIG. 1 represents a block diagram showing the visually controlled robot system of the present invention.

The visually controlled robot system of the present invention has a robot 1 that is three-dimensionally driven by instructions from the controller 11, video cameras 2 that are able to take images of the entire moving area of the robot 1 from at least two directions, a visible target 3 existing within the moving area of the robot 1, and a control circuit 10 that recognizes beforehand the moving area of the robot 1 and gives the controller 11 an ordering signal to displace the robot 1 to the position of the visible target 3 as photographed by the video cameras 2.

In the visually controlled robot system to which the present invention applies, the control circuit is connected to the display means 12 and the input means 13 and/or 14 for indicating coordinates of the image on the display means 12 to which robot movement is desired. This system may have a function to give the controller 11 an ordering signal that displaces the robot 1 to the position corresponding to the coordinates indicated by the input means 13 and/or 14.

Referring now to the drawings, a specific embodiment of the visually controlled robot system of the present invention is described below. The scope of the present invention is, however, is not to be limited to the below described embodiment:

FIG. 1 is a block diagram of an embodiment of the visually controlled robot system according to the present invention. As shown in FIG. 1, there are three video cameras 2x, 2y and 2z installed to visually monitor the entire moving area of robot 1 from three directions. Connected to the robot 1 is the controller 11, which is linked with the control circuit, or "CPU", 10 through the intermediary of the input/output, or "I/O", interface 15. The three units of video cameras 2x, 2y and 2z are linked with the control circuit 10 through the intermediary of an analog/digital converter or "A/D", 16. Connected to the control circuit 10 are a cathode-ray tube, or "CRT", display 12 as a display means and a keyboard 13 and a mouse 14 as input means. A visible target 3 is also provided for detection by video cameras 2x, 2y and 2z. The visible target 3 has a built-in battery and an infrared light emitting diode incorporated in its surface. Target 3 has an adhesive portion so that it may stick to the surface of an object.

The control circuit 10 has a function to recognize, as a moving range, the coordinates to which the robot has been displaced and another function to recognize the position of the visible target 3 from the video signal of the target 3 as photographed by the video cameras 2x, 2y and 2z. Further, the control circuit 10 has a function to give the controller 11 an ordering signal to displace the robot 1 to the position corresponding to the visible target 3 and another function to give the controller 11 an ordering signal that displaces the robot 1 to the position corresponding to coordinates as inputted by the keyboard 13 and/or mouse 14.

In this embodiment, the cathode ray tube display 12, keyboard 13 and mouse 14 have been loaded on a wheel chair.

The operation of the visually controlled robot system in the foregoing embodiment is described below with reference to the flow chart FIG. 2:

The operation starts with Step 101, where control circuit 10 perceives the entire moving area of robot 1. With the infrared light emitting diode of visible target 3 kept on, the robot is made to hold the visible target 3 at a position within the moving area of the robot 1, that is, within the visual field area of the video cameras 2x, 2y and 2z. From the keyboard 13 or mouse 14, the coordinates of the moving area limit of the robot 1 are given to the control circuit 10, from which the ordering signal displaces the robot 1 to its moving area limit by way of the controller 11. The image of the visible target 3 is taken by the video cameras 2x, 2y and 2z whose analog video signal is converted into digital signal by the analog/digital converter 16 to be read into the control circuit 10, where the total moving area of the robot 1 is recognized, and the coordinates and ordering signal stored in the memory area.

In Step 102, visible target 3 is held by the robot 1 at a given position A within the moving area and the image thereof is taken by the video cameras 2x, 2y and 2z with the position A computed and stored into the control circuit 10 as an initial position of the robot 1.

In Step 103, the first position to which the robot 1 will be displaced is memorized in the control circuit 10. When to that effect the visible target 3 is removed from the robot 1 and installed at a position B within the moving area of the robot 1, for instance, on a wheel chair with a patient in it (at position B which is not shown, Refer to the arrowed direction A→B), the images of visible target 3 at the position B is taken by the video cameras 2x, 2y and 2z whose video signal is read into the control circuit 10. The position B of the visible target 3 is computed to be stored in the control circuit 10. Since the position B of the visible target 3 at that time differs from the initial position A of the robot 1, the control circuit 10 in Step 104 prepares, from the memory of the storage device, the ordering signal to displace the robot 1 to the position B of the visible target 3. This signal is given to the controller 11 through the input/output interface 15. The robot 1, which receives a control signal from the controller 11, displaces to the position B of the visible target 3, namely to the wheel chair.

Upon arrival of the robot 1 at the wheel chair, the patient on the chair selects by the keyboard 13 or mouse 14 another destination C, such as a drug shelf, displayed on the cathode-ray tube 12 in step 105. Then the position is entered into the control circuit 10 as an interrupt signal.

In Step 106, an ordering signal is determined for the coordinates at C, by means of the memory stored, and output at the controller 11 through the input/output interface 15. By the ordering signal from the controller 11, robot 1 moves to position C, that is to the drug shelf, where, as an essential task of the robot 1, it grasps a drug.

When the patient releases the interrupt signal in the control circuit 10 from the keyboard 13 in Step 107, the position B of the visible target 3 as photographed by the video cameras 2x, 2y and 2z differs from the position C, where the robot 1 holds the drug.

In Step 108, the control circuit 10 returns the robot 1 to the position B of the visible target 3 by an ordering signal which is computed by the memory from the coordinate B being photographed and given to the controller 11 through the input/output interface 15. By the control signal of the controller 11, the robot 1 will carry the drug to the position B, that is, to the wheel chair.

Although three units of video cameras 2x, 2y and 2z are provided in this embodiment, as a minimum, two cameras will suffice. If two video cameras are taking images of visible target 3, since each video camera can take a 2-dimension image under normal conditions, the three-dimensional position thereof can be analyzed. However, in some cases where the visible target 3 enters a shadow of an object, the target's image often cannot be taken by two video cameras if the system is provided with only two video cameras. It is therefore desirable that at least three video cameras are used and that at least two video cameras can receive the visible target's image for any position of the visible target.

As described above, the addition of visual recognition equipment to a robot enables visual control of the robot's movement. The visually controlled robot system may thus be provided at an extremely low cost. The visually controlled robot system according to the present invention may be used, for instance, in the care of patients.

What is claimed is:

1. A visually controlled robot system comprising:

a robot means for moving three-dimensionally, means for taking images of the entire moving area of the robot, the means for taking images comprising three video cameras mounted on three mutually perpendicular axis's placed to provide images of the entire moving area of the robot from at least two directions, a visible target existing within the moving area of the robot, a control circuit having a function to recognize beforehand the moving area of the robot and another function to store in a memory the position of the visible target taken by said means for taking images as well as an ordering signal to move the robot so said position, and a drive control means for driving the robot by said ordering signal from the memory of the control circuit.

2. A visually controlled robot system as claimed in claim 1, further comprising;

a display means for displaying a coordinate system of the moving area of the robot and an input means, for entering a coordinate from the display means, wherein the control circuit further has a function to give said drive control means an ordering signal to move the robot to a position corresponding to the coordinate entered.

3. The visually controlled robot system as claimed in claim 1, wherein said video cameras are infrared video cameras and said visible target has an infrared light emitting diode and a battery and is able to bond to a surface of an object.

4. The visually controlled robot system as claimed in claim 1, wherein said display means and input means are on a wheel chair.

* * * * *